United States Patent [19]
Langston et al.

[11] Patent Number: 5,211,537
[45] Date of Patent: May 18, 1993

[54] COMPRESSOR VANE LOCK

[75] Inventors: Todd A. Langston, Stuart; Kevin B. McDonnell, Tequesta; Thomas J. McCarty, West Palm Beach, all of Fla.

[73] Assignee: United Technologies Corporation, Hartford, Conn.

[21] Appl. No.: 847,608

[22] Filed: Mar. 2, 1992

[51] Int. Cl.⁵ ............................................ F04D 29/54
[52] U.S. Cl. ................................ 415/209.2; 403/261; 403/256; 403/405.1; 411/354; 411/522; 415/209.3
[58] Field of Search .................. 415/191, 208.1, 209.2, 415/209.3; 403/261, 256, 155, 405.1; 411/522, 523, 524, 354

[56] References Cited

U.S. PATENT DOCUMENTS

| | | | |
|---|---|---|---|
| 2,622,790 | 12/1952 | McLeod | 415/209.3 |
| 2,801,822 | 8/1957 | Speed | 415/209.3 |
| 2,957,228 | 10/1960 | Stoddard et al. | 415/209.3 |
| 3,182,367 | 5/1965 | Hamann et al. | 411/522 |
| 3,303,992 | 2/1967 | Johnson | 230/114 |
| 3,606,406 | 9/1971 | Walters | 403/261 |
| 3,779,665 | 12/1973 | Tatem, Jr. et al. | 415/123 |
| 4,848,089 | 7/1989 | Cramer | 411/523 |
| 5,024,580 | 6/1991 | Olive | 403/261 |
| 5,062,767 | 11/1991 | Worley et al. | 415/209.3 |

FOREIGN PATENT DOCUMENTS 2138044 10/1972 Fed. Rep. of Germany ...... 411/522

Primary Examiner—John T. Kwon
Attorney, Agent, or Firm—Edward L. Kochey, Jr.

[57] ABSTRACT

Variable compressor vanes are locked into a selected position after testing. The usual sync ring and vane arms are removed. A vane lock joins adjacent vanes locking them into the selected position.

7 Claims, 3 Drawing Sheets

COMPRESSOR VANE LOCK

The Government has rights in this invention pursuant to a contract awarded by the Department of the Air Force.

DESCRIPTION

1. Technical Field

The invention relates to compressors with variable vanes and in particular to an apparatus for locking the variable vanes in a fixed position.

2. Background of the Invention

Gas turbine engines frequently use compressors with variable stator vanes for the various compressor stages. Each vane has a vane arm secured to it for rotating the vane. A sync ring is connected to all the vane arms of a single stage to provide simultaneous positioning of the vanes at that stage.

Occasionally it is determined that the vanes of a particular stage should be fixed at a test determined position for production engines. That practice involves bolting of the sync ring to the compressor case. This retains the sync ring, the driving mechanism for the ring, and accordingly does not provide weight and cost savings.

It is an object of the invention to lock the variable vanes of a selected stage in a manner which provides significant cost and weight savings without major design changes.

3. Summary of the Invention

A plurality of variable vanes are located with the valve stem rotatably mounted within valve stem receiving openings within the casing. An abutment surface between the vanes and the casing locates the vanes against outward movement. External of the casing there is located on the vane stem a pair of flat parallel circumferentially extending flats. A vane lock connects two adjacent vane stems and is bolted with a radial bolt through the end of each vane stem. The vane lock has a pair of resilient C-shaped lock arms at each end of the vane lock with the end of each arm in firm contact with one of the flats. This fixes the variable vanes in the desired position and prevents rotation thereof.

DESCRIPTION OF THE PREFERRED EMBODIMENT

Figure 1:
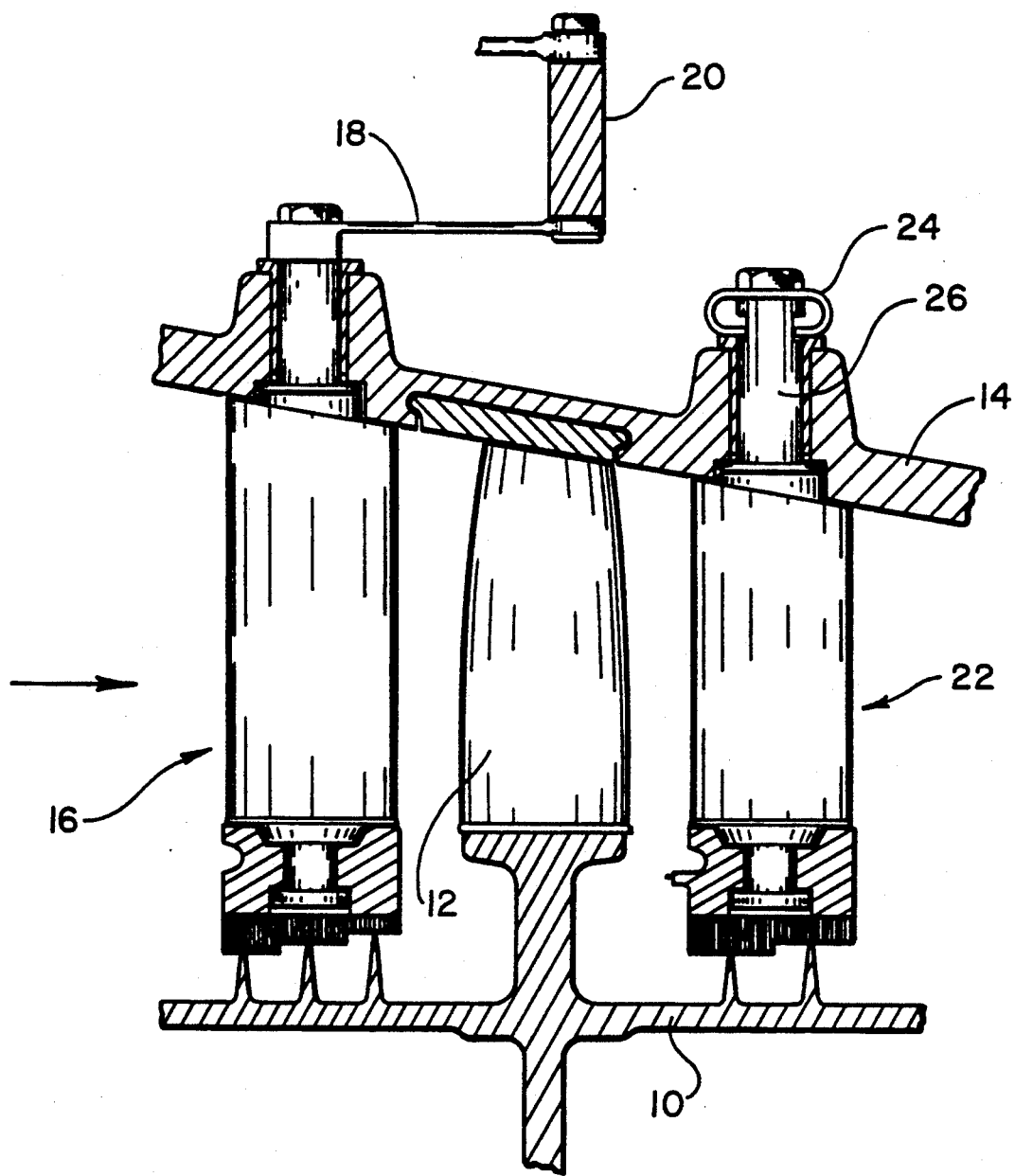
FIG. 1 is a section through a portion of a gas turbine engine compressor showing two vane stages and a rotor stage.

FIG. 1 illustrates a portion of a gas turbine compressor with rotor 10 carrying blades 12 located within compressor casing 14. Variable vanes 16 are driven by vane arms 18 to various selected positions by sync ring 20.

Variable vanes 22 were connected in the same manner as vane 16 during test operation, but it has been determined that these vanes are preferably fixed at a preselected position. Details of the vane lock 24 and the vane stem 26 are better seen with reference to FIGS. 2-5.

Figure 2:
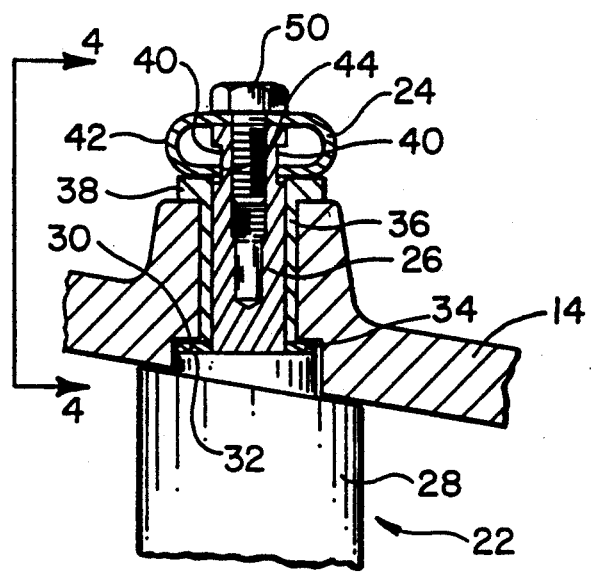
FIG. 2 is a sectional side view through the end of a variable vane showing the lock arm in place.
Figure 3:
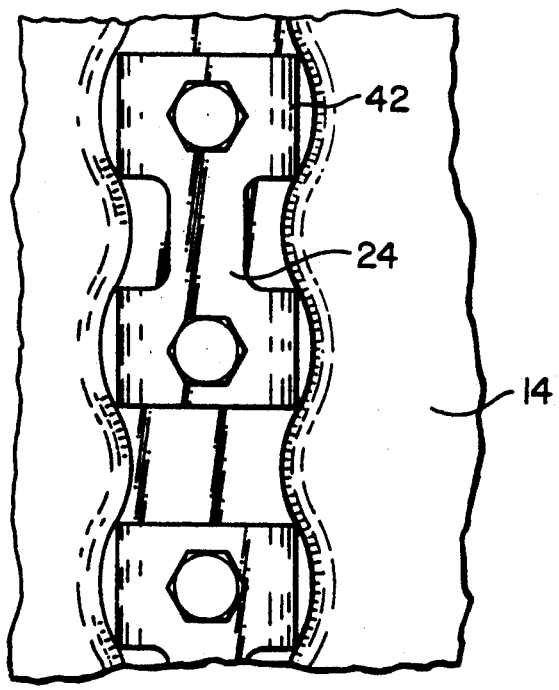
FIG. 3 is a top view of FIG. 2.
Figure 4:
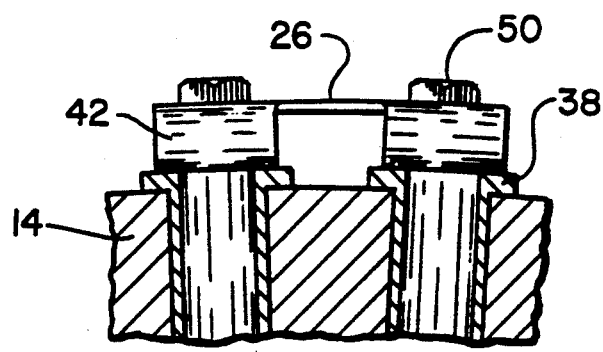
FIG. 4 is a forward view of FIG. 2.
Figure 5:
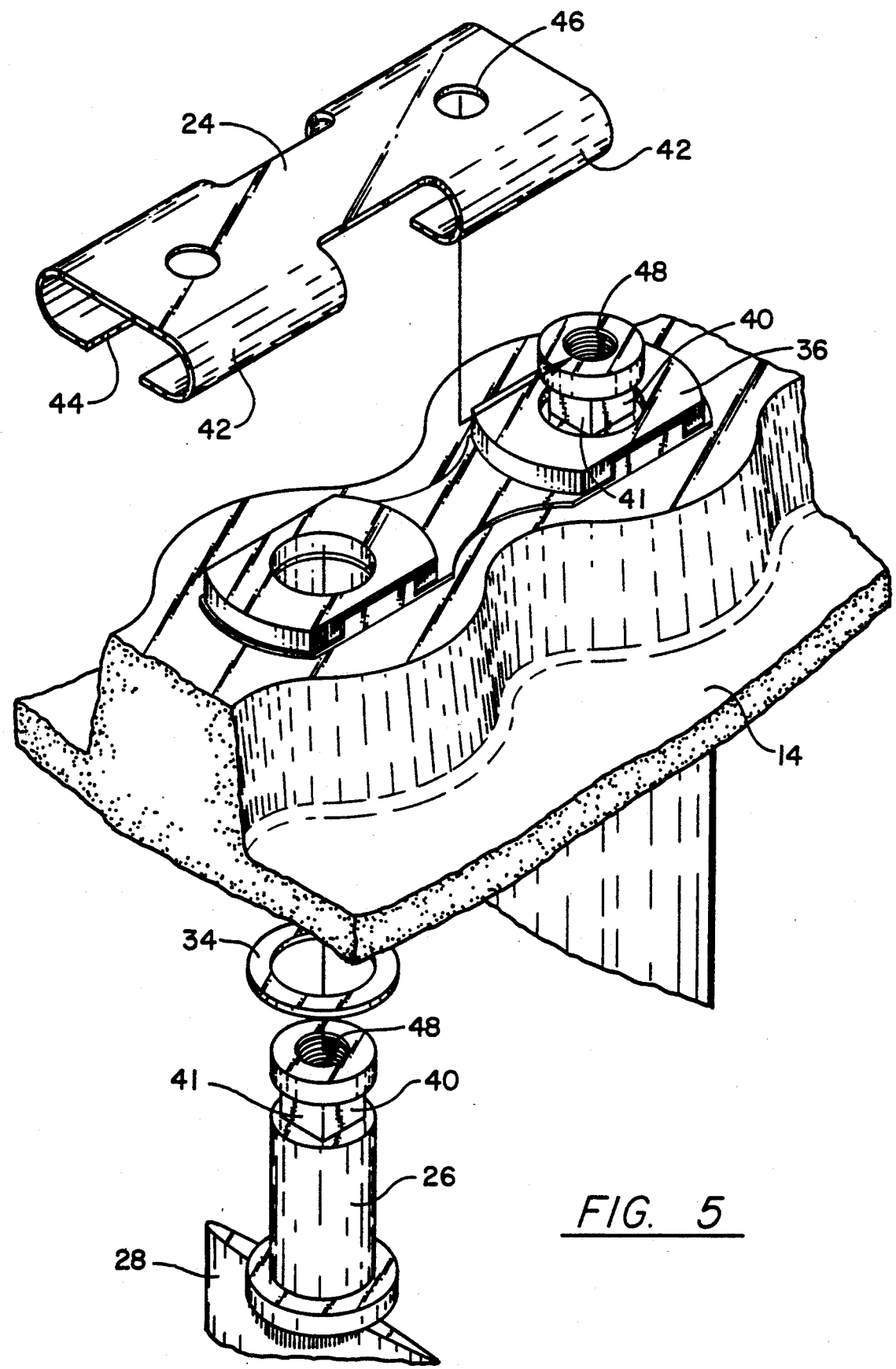
FIG. 5 is an exploded view of the vane lock arrangement.

Referring to FIG. 2, vane 22 includes an airfoil 28 and a vane stem 26 fixedly secured thereto. The vane has an outwardly facing abutment surface 30 abutting against an inwardly facing abutment surface 32 of the casing. Washer 34 is a separate component. It is considered and claimed as a portion of the casing 14 since it functionally resists the thrust force of the vane. Its chief advantage is in facilitating the fabrication of the components.

In a similar manner, bushing 36 has a shoulder 38 resting against the body of the casing 14 and forms a portion of the casing 14 since it functionally resists the forces between the vane and the casing.

A pair of flat, parallel circumferentially extending flats 40 are machined on the valve stem of each vane. Flats 41 are not necessary to the invention except that they are the flats which were used for the vane arms when the vane was connected to a sync ring.

The vane lock has a pair of resilient C-shaped lock arms 42 at each end of the vane lock. These are formed with one end 44 of each arm in firm contact with one of the flats 40. The vane lock is initially located with the arms between adjacent vanes and slid circumferentially until the holes 46 and the vane lock line up with radial holes 48 (with respect to the rotor axis) in the end of the vane stem. Bolt 50 then secures the vane lock to the vane stem. The vane lock thereby connects two adjacent vane stems, engaging the flat and preventing any rotation of either.

The slots formed by flat 40 preferably do not extend to the end. If one of the bolts 50 should inadvertently shake loose, the vane lock will still remain in place and fulfill its function.

As best seen in FIG. 2, the slot formed by flat 40 extends down below the surface of the bushing 36. When bolt 50 is tightened, the vane lock 24 exerts a resilient force (axially with respect to the bolt head) between the bolt head and the casing and accordingly places the abutment surfaces 30 and 32 in contact. This retains the vane firmly in place.

We claim:

1. A compressor arrangement with locked variable vanes comprising:
   a compressor casing;
   a plurality of valve stem openings in said casing, circumferentially spaced around said casing, and an inwardly facing vane abutment surface adjacent each opening;
   a plurality of vanes, each vane comprising an airfoil, a vane stem fixedly secured thereto, and a casing abutment surface adjacent said vane stem;
   said plurality of vanes circumferentially arranged in said openings with each vane abutment surface and a corresponding casing abutment surface in contact;
   a pair of flat parallel circumferentially extending flats formed on the vane stem of each vane;
   a radial threaded bolt opening in the end of each vane stem;
   a vane lock connecting two adjacent vane stems and bolted to said bolt openings; and
   said vane lock having a pair of resilient C-shaped lock arms at each end with one end of each arm in firm contact with one of said flats on said vane stem.

2. A compressor arrangement as in claim 1 further comprising:

said lock arms resiliently axially with respect to the vane stem compressed in the installed position against said casing.

3. A compressor arrangement as in claim 1 further comprising:
    each of said C-shaped lock arms at each end of said vane lock having a width parallel to a line joining said adjacent vane stems, and extending outwardly from said line, then toward said casing, and then toward said vane stem.

4. A compressor arrangement as in claim 1 further comprising:
    said flats on each vane stem comprising a groove short of the end of said vane stem, whereby said vane lock remains engaged despite the loss of a single bolt.

5. A compressor arrangement as in claim 2 further comprising:
    each of said C-shaped lock arms at each end of said vane lock having a width parallel to a line joining said adjacent vane stems, and extending outwardly from said line, then toward said casing, and then toward said vane stem.

6. A compressor arrangement as in claim 3 further comprising:
    said flats on each vane stem comprising a groove short of the end of said vane stem, whereby said vane lock remains engaged despite the loss of a single bolt.

7. A compressor arrangement as in claim 2 further comprising:
    said flats on each vane stem comprising a groove short of the end of said vane stem, whereby said vane lock remains engaged despite the loss of a single bolt.

* * * * *